United States Patent [19]

Chandler et al.

[11] Patent Number: 5,155,343

[45] Date of Patent: Oct. 13, 1992

[54] OMNIDIRECTIONAL BAR CODE READER WITH METHOD AND APPARATUS FOR DETECTING AND SCANNING A BAR CODE SYMBOL

[76] Inventors: Donald G. Chandler, 43 Springwood Ct.; Eric P. Batterman, 207-11 Salem Ct., both of Princeton, N.J. 08540

[21] Appl. No.: 501,259

[22] Filed: Mar. 28, 1990

[51] Int. Cl.⁵ .................. G06K 7/10; G06K 9/18
[52] U.S. Cl. .................... 235/462; 235/463; 235/470; 235/454; 382/11; 382/12
[58] Field of Search ........... 235/462, 463, 470, 454, 235/472; 382/48, 61, 11, 12

[56] References Cited

U.S. PATENT DOCUMENTS

| | | | |
|---|---|---|---|
| 3,801,775 | 4/1974 | Acker | 235/61.11 |
| 4,000,397 | 12/1976 | Hebert et al. | 235/463 |
| 4,007,377 | 2/1977 | Simon et al. | 235/467 |
| 4,232,216 | 11/1980 | Helle | 235/462 |
| 4,282,425 | 8/1981 | Chadima et al. | 235/462 |
| 4,354,101 | 10/1982 | Hester et al. | 235/472 |
| 4,394,683 | 7/1983 | Liptay-Wagner et al. | 358/107 |
| 4,488,679 | 12/1984 | Bockholt et al. | 235/469 |
| 4,500,776 | 2/1985 | Laser | 235/162 |
| 4,570,057 | 2/1986 | Chadima et al. | 235/472 |
| 4,652,731 | 3/1987 | Chautemps et al. | 235/462 |
| 4,727,419 | 2/1988 | Yamada et al. | 358/101 |
| 4,749,879 | 6/1988 | Peterson et al. | 235/436 |
| 4,766,300 | 8/1988 | Chadima et al. | 235/472 |
| 4,874,936 | 10/1989 | Chandler et al. | 235/494 |
| 4,896,029 | 1/1990 | Chandler et al. | 235/494 |
| 4,958,064 | 9/1990 | Kirkpatrick | 235/384 |

Primary Examiner—Stuart S. Levy
Assistant Examiner—Tan Nguyen
Attorney, Agent, or Firm—Allan J. Jacobson

[57] ABSTRACT

A bar code reader includes an optical system for storing a two dimensional image in memory, which stored two dimensional image contains a bar code symbol. A method and apparatus is disclosed for detecting the location of said bar code image by computing the accumulated sum of the products of the derivatives of respective first and second scan lines as a location score for the image under consideration. The higher the location score, the higher the probability that the area under consideration contains a bar code image. Also, a method and apparatus is disclosed for determining the fine orientation of a located bar code image by the cross-correlation of interpolated scan line data. The bar code image is filtered by shifting interpolated scan line data in accordance with the detected peak of the cross-correlation and combining the shifted scan line data.

58 Claims, 12 Drawing Sheets

LOCATION SCORE = 810

OMNIDIRECTIONAL BAR CODE READER WITH METHOD AND APPARATUS FOR DETECTING AND SCANNING A BAR CODE SYMBOL

FIELD OF THE INVENTION

This invention relates to the field of machine readable symbols, and particularly to a method and apparatus for high speed omnidirectional reading of bar code symbols.

BACKGROUND OF THE INVENTION

In a co-pending patent application entitled "IMPROVED METHOD AND APPARATUS FOR A HIGH SPEED OMNIDIRECTIONAL BAR CODE READER", Ser. No. 500,802 filed Mar. 28, 1990, and assigned to the assignee of the present application, a bar code reader is disclosed which provides for high speed omnidirectional reading of multiple or stacked bar code symbols, or even damaged bar code labels, which may be at a random orientation, distance and relative motion with respect to the reader.

A bar code is a particular type of machine readable symbol. A typical bar code includes parallel solid lines, or bars, of varying width and spacing. The alternating light and dark areas defined by the bars and the spaces between the bars, represent a digital code which serves to identify the content of the bar code symbol. After being read, the digital code is then directly translated to a sequence of alphanumeric characters and then by means of a data base, may be further translated to the common language description of the item bearing the subject bar code label, along with other pertinent data, such as for example the current price of the item.

A bar code may be read by scanning. Typically, a small spot of light is directed from a source of illumination to the surface of the bar code. The reflected light is sensed by a photosensitive element. The small illuminated spot of light is then swept across the bar code surface, all the while sensing the intensity of the resulting reflected light. Since light areas reflect more light than dark areas, the reflected light intensity represents the digital code which serves to identify the content of the bar code symbol.

In one type of bar code reader, a hand held laser or LED is used as the source of illumination, and the reader is manually swept across the bar code surface. In a scanning type of bar code reader, the light source is stationary while the light beam is moved in a scanning pattern. In a particular type of bar code scanner, a laser beam is swept through a complex series of repetitive geometric patterns in order to provide for some degree of omnidirectional scanning. However, due to the limitations of laser type bar code scanners, it is difficult to obtain reliable consistent bar code reading, particularly when used with damaged bar code labels.

In another type of bar code reader, an image of a bar code is formed on an array of photosensitive elements, and subsequently stored in a memory for further processing. However, in the latter type of prior art bar code reader, it has still been necessary to position and orient the bar code to the reader.

In general, in the prior art, it is typically necessary for the operator to either orient the bar code, or otherwise position the bar code and/or the reader manually in order to achieve proper operation.

The present invention is embodied in a bar code reader in which bar codes are rapidly and reliably read. Furthermore, a bar code reader in accordance with the present invention provides for high speed omnidirectional reading of multiple or stacked bar code symbols, or even damaged bar code labels, which may be at a random orientation, distance and relative motion with respect to the reader.

SUMMARY OF THE INVENTION

In the above mentioned co-pending patent application, an omnidirectional bar code reader includes, 1) means for capturing and storing a two dimensional image in memory storage, which stored image includes a bar code symbol somewhere within the field of view, 2) detecting means for processing the stored image for detecting a potential location, or locations, anywhere within the field of view of the stored image, each of which locations being likely to contain a bar code symbol, 3) orientation processing means for determining the orientation of said detected bar code symbol at said detected location likely to contain a bar code symbol, 4) filtering means for filtering said detected bar code symbol in a direction perpendicular to said determined orientation of said detected bar code symbol in order to utilize the redundancy of the bar code symbology, and 5) means for scanning through said detected bar code symbol at a location corresponding to said detected potential location and at an angle substantially corresponding to said determined orientation of said detected bar code symbol A bar code reader in accordance with the present invention includes a method and apparatus for performing the second step in the above mentioned bar code reader, i.e. determining which areas of the stored two dimensional image are the locations likely to contain a bar code symbol.

First, two parallel scan lines are selected. Then, the derivatives of the first and second scan lines respectively, are calculated. Thereafter, the point by point product of respective derivatives of said first and second scan lines is computed. An accumulated total of the sum of the respective products of derivatives of the first and second scan lines is computed as a location score which represents the relative probability that the area of the stored two dimensional image under consideration contains a bar code symbol. The higher the location score for given area, the more likely the area is to contain a bar code symbol.

More specifically, the approximate derivative of a scan line is calculated as the difference between adjacent pixel values. Since the bars of a bar code are black to white transitions, and vice versa, a scan across the bars will produce high magnitude difference values, both positive and negative. It is suggested that the first and second scan lines be adjacent, but not too close. For example, it is suggested that the first and second scan lines be four scan lines apart. In the presence of a bar code, the approximate derivative of the second scan line will produce similar high magnitude difference values, both positive and negative and in the same sequence as for the first scan line. The product of the two approximate derivatives will be all high magnitude positive values since, for parallel bars, the high positive and high negative values will be aligned. In order to assure better alignment at slight angles, and improve processing speed, every other pixel value may be used in computing the approximate derivative.

In accordance with another aspect of the present invention, a bar code reader includes a method and apparatus for performing the third step in the above mentioned bar code reader, i.e. determining the orientation of the detected bar code symbol at the detected location likely to contain a bar code symbol.

First, a plurality of parallel scan lines in a given area is selected. Then, processing parallel scan lines in pairs, first and second scan lines are interpolated to provide a smooth curve of first and second interpolated scan line data. Thereafter, first and second interpolated scan line data are cross-correlated. The cross-correlation function is a measure of the similarity, or correlation, between two curves as a function of the relative position of the two curves, i.e. as one curve is translated relative to the other curve. The peak of the cross-correlation function for the first and second interpolated scan line data represents the offset between the first and second scan lines. The detected position of the peak of the cross-correlation function and the distance between the first and second interpolated scan line data are used to calculate the fine orientation, or angle, of the bars of the bar code symbol.

More specifically, if the peak of cross-correlation function is located at zero, then the first and second scan lines are exactly aligned. In the latter case, the orientation angle of the bar code is zero, i.e. the bar code is perpendicular to the first and second parallel scan lines.

In the more general case, the location of the peak of the cross-correlation function represents the offset between the first and second scan lines. The calculated offset is used to shift the two scan lines into alignment. Using the calculated offset, which is determined from the located peak of the cross-correlation function for each line pair, each scan line through the bar code is shifted into alignment, which compensates for the angle between the scan lines and the bar code. The located peak of the cross-correlation is also a measurement of the fine orientation angle of the bar code symbol. After the scan lines are aligned, the bar code symbol is filtered by computing the average value of the corresponding data points of the shifted and aligned scan line data. In the alternative, the median value of the corresponding data points of the shifted and aligned scan line data ma be used to filter the bar code image.

In order to calculate the actual fine orientation angle of the bar code symbol, the position of the peak of the cross-correlation function is used in conjunction with the known spacing between the first and second scan lines. In particular, the tangent of the angle of the bar code symbol is the ratio of the offset between the first and second scan lines to the distance between the first and second scan lines. Thus, the fine orientation angle of the bar code symbol is the arctangent of the ratio of the calculated position of the peak of the cross-correlation function to the distance between the first an second scan lines.

Finally using the computed fine orientation angle of the bar code symbol, successive partial scans taken along the computed fine orientation angle are concatenated to form a complete scan.

DETAILED DESCRIPTION

Figure 1:
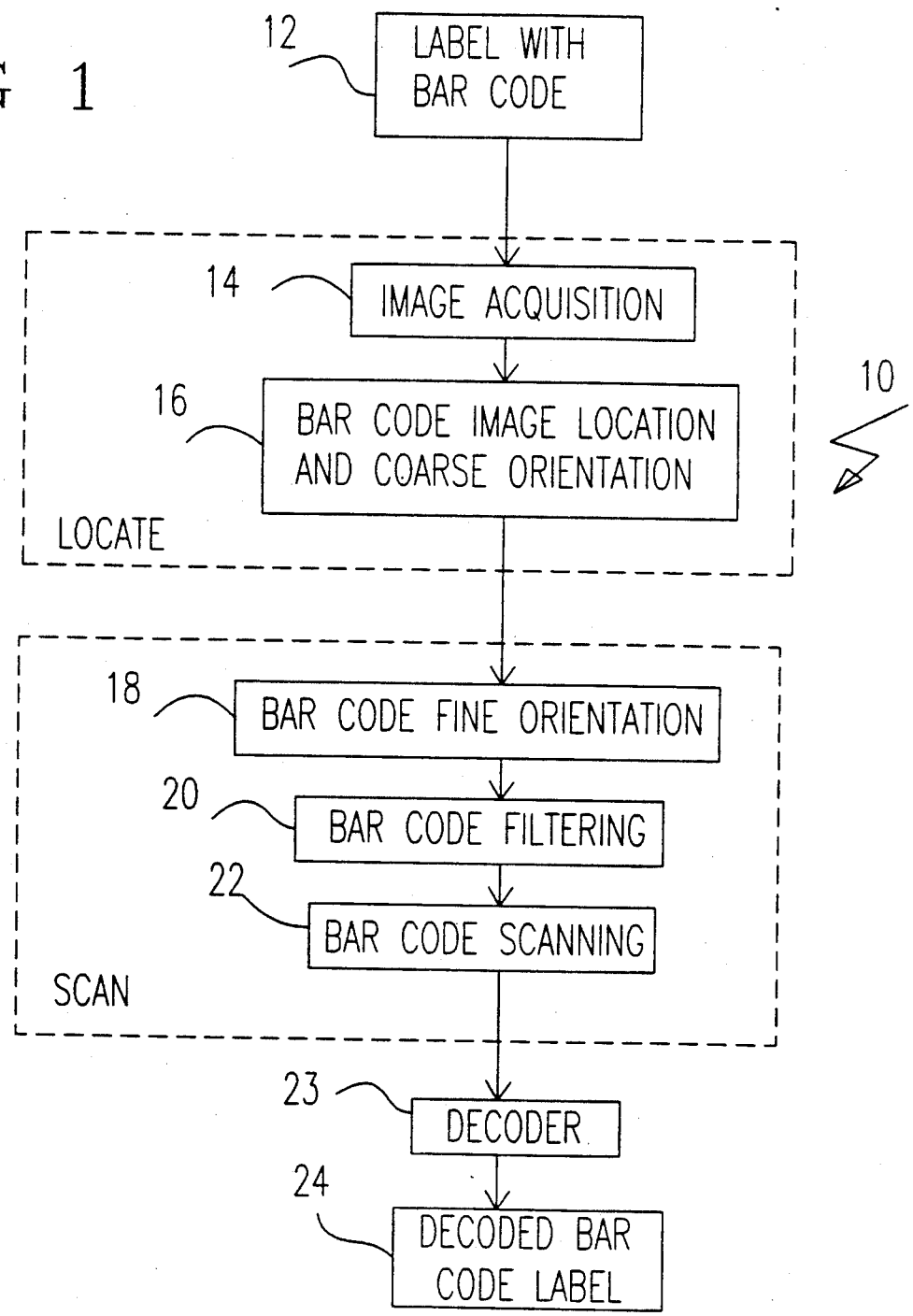
FIG. 1 is a block diagram, partially in flow chart form, indicating a method and apparatus in accordance with the present invention.

A brief overview of a bar code reader in accordance with the present invention is shown in FIG. 1. An image acquisition system 14 which includes the necessary optical and photosensitive elements, captures an image of the reader's field of view, which captured image may contain a bar code label 12.

Once the image is acquired in memory, means are provided for bar code image location and coarse orientation 16. Together, image acquisition 14 and bar code image location and orientation 16 comprise the portion of the present bar code reader which serves to generally locate a bar code within a field of view.

After the bar code image is located within the field of view and its coarse orientation determined, means 18 are provided for determining the fine orientation of the bar code. Having located the bar code and determining its fine orientation, means 20 for filtering the bar code, are provided. Thereafter, bar code scanning 22 is performed. The operation of determining the fine orientation 18, bar code filtering 20, and bar code scanning 22, together comprise the portion of the present bar code reader which serves to "scan" a bar code once having been located within a field of view. After bar code scanning, a decoder 23 well known to those skilled in the art, provides the decoded bar code label output 24.

The operation of "scanning a bar code", as used in the prior art, relates to sweeping an illuminated spot across a bar code. As used herein, with respect to the present invention, the operation of "scanning a bar code" means to extract from image memory storage, sequential values derived from said image memory storage corresponding to reflectivities along a sweep traversing the bar code.

Figure 2:
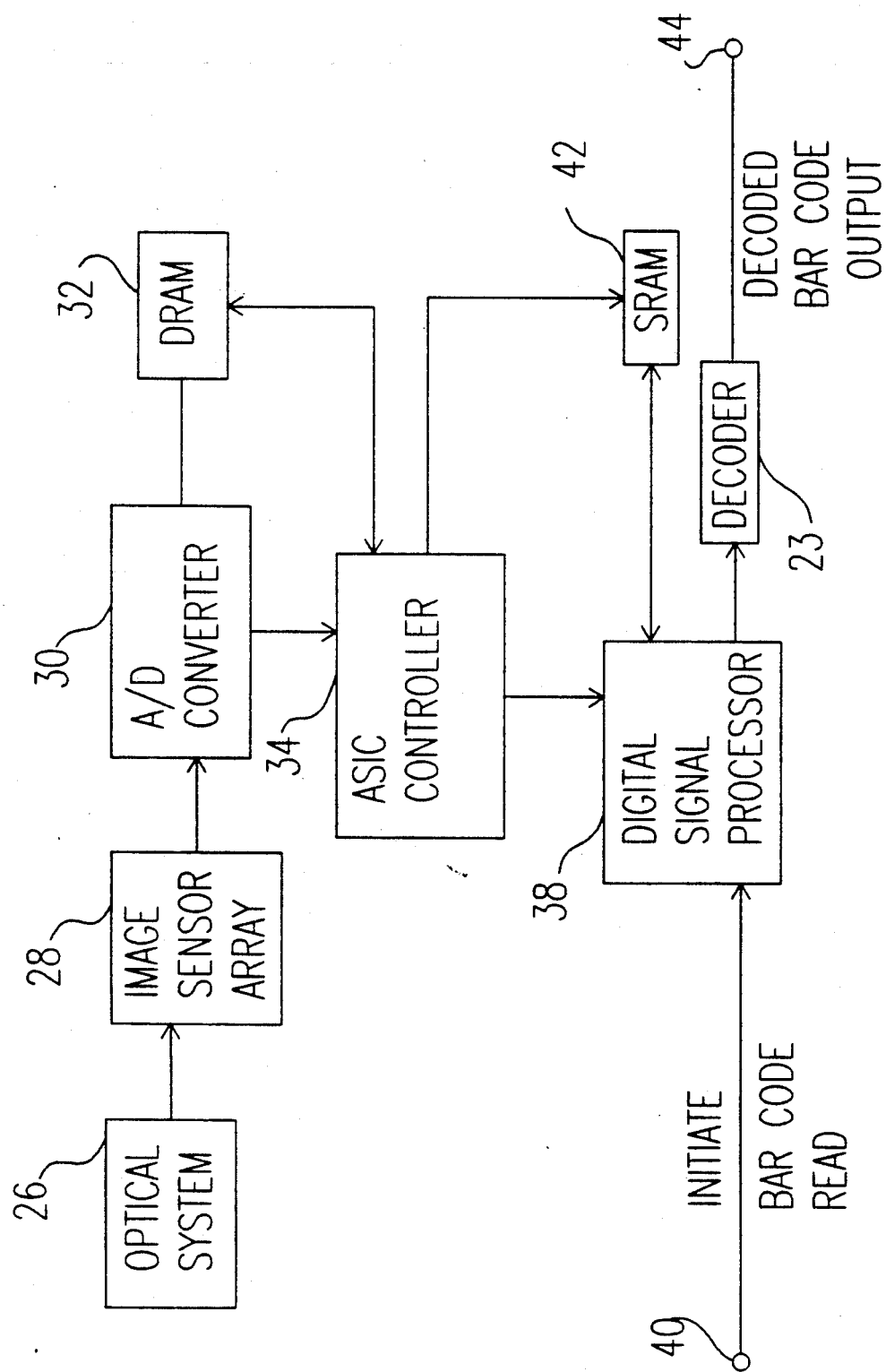
FIG. 2 is a block diagram of a system for a bar code reader in accordance with the present invention.

A preferred hardware embodiment of the present invention is shown in FIG. 2. An optical system 26 is coupled to an image sensor array 28. The output of the image sensor array 28 is converted from analog to digital in A/D converter 30, and stored in a first memory 32. The first memory 32 is preferably a dynamic random access memory (DRAM). A controller 34 which may be an application specific integrated circuit (ASIC) controls the image acquisition system so as to capture and digitize an image and store it in DRAM 32. The ASIC controller 34 also performs several other processing tasks under the control of a digital signal processor 38. Digital signal processor 38 is typically a high speed microprocessor such as the ADSP-2101 available from Analog Devices, Norwood, Mass. The memory space for digital signal processor 38 is both ROM for program storage and a static random access memory 42 (SRAM) for image processing storage. Portions of the stored image memory in DRAM 32 are transferable to SRAM 42 under the control of ASIC controller 34. Finally, an input terminal 40 is coupled to the input of digital signal processor 38, and output terminal 44 is coupled to a decoder 23 which is coupled to the output of digital signal processor 38.

In operation, a bar code read is initiated by an input signal on terminal 40 to digital signal processor 38. Responsive to the control outputs of digital signal processor 38, ASIC controller 34 acquires an image for storage in DRAM memory 32. Also responsive to the control outputs of digital signal processor 38, ASIC controller 34 processes the stored image in DRAM 32 so as to determine the potential location or locations which are likely to contain a bar code symbol. For location processing, the image stored in DRAM 32 is divided into smaller areas, or cells, and a location score is assigned to each cell. The higher the location score for a given cell, the more likely is the cell to contain at least a partial bar code symbol.

When the ASIC controller 34 has completed its location scoring task, digital signal processor 38 examines the resulting scores and commands the ASIC controller 34 to transfer those image areas of interest from DRAM 32 to SRAM 42. Digital signal processor 38 thereafter processes the partial image in SRAM 42 to determine the orientation of the stored bar code image, to filter the oriented bar code image along a direction perpendicular to the determined orientation, and to scan the oriented and filtered bar code image. After all areas of interest have been transferred from DRAM 32 to SRAM 42 and processed by digital signal processor 38, a complete bar code output scan is provided to decoder 23 which provides a decoded bar code label output at terminal 44.

On the other hand, if by examination of the location scores, no bar code was found in the stored image in DRAM 32, then digital signal processor 38 through ASIC controller 34 may command the optical system 26, the image sensor array 28 and the A/D converter 30 to acquire another image in DRAM 32 for processing. The process of acquiring and processing images may continue until a bar code symbol is successfully scanned.

Figure 3:
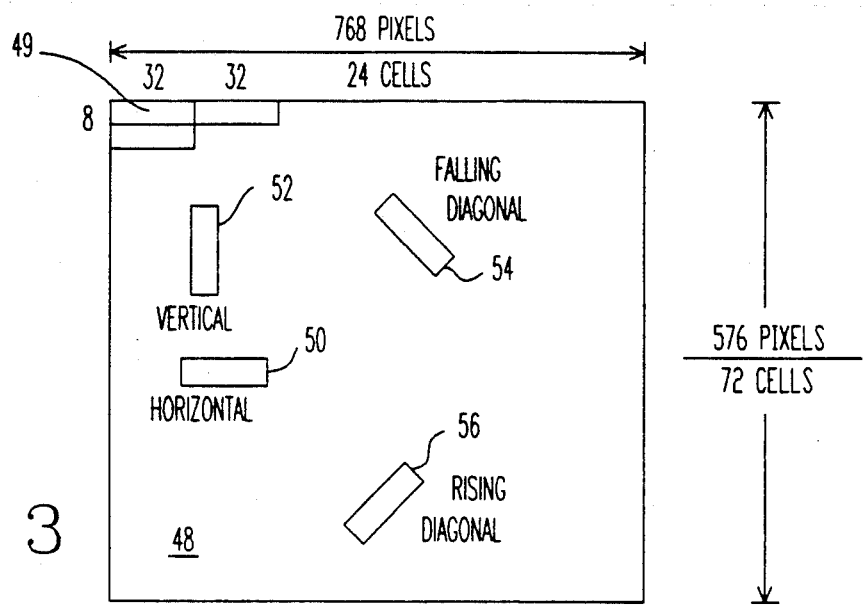
FIG. 3 is a graphical representation of a two dimensional image area illustrating individual cells used in determining location and orientation of a bar code symbol in accordance with the present invention.

The organization of the stored DRAM image area 48 is shown in FIG. 3. The image sensor array 28 (FIG. 2) has 768 pixels in the horizontal direction and 576 pixels in the vertical direction. A suitable image sensor for use with the present invention is the MOS image sensor array 98268 available from Hitachi Corporation. The image area 48 is conceptually divided into cells, such as cell 49. Specifically, the image area 48 is divided into 24 cells in the horizontal direction and 72 cells in the vertical direction, with each cell being 8 by 32 pixels. That is, each cell has 8 scan lines, with each scan line having 32 pixels.

The image area 48 is divided into cells in each of four directions. That is, image area 48 is divided into horizontal cells such as cell 50. However, image area 48 is also divided vertical cells such as cell 52. Similarly, image area 48 is divided into cells along a rising diagonal i.e. 45 degrees such as cell 56. Finally, image area 48 is divided into cells along a falling diagonal i.e. 135 degrees such as cell 54. Using four directions of scan lines permits the location process to also determine the coarse orientation of the located bar code image in the same operation.

Figure 3A:
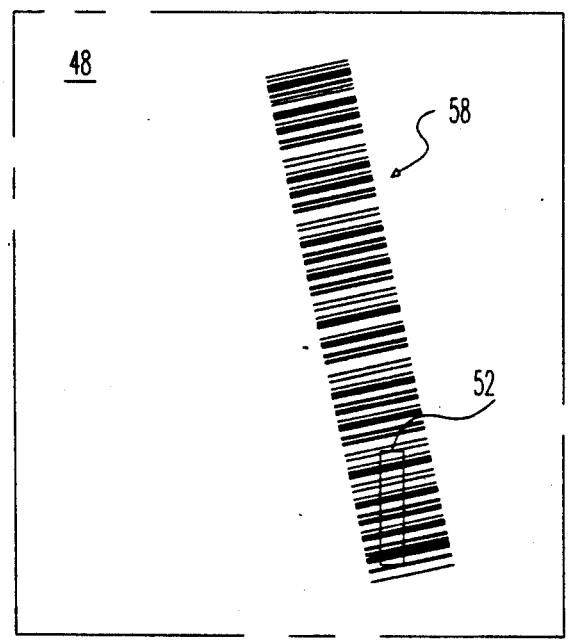
FIG. 3A is a representation of a portion of the image area of FIG. 3, which portion contains a bar code symbol.

For purposes of illustration, FIG. 3A shows a bar code symbol somewhere within the field of view of image area 48 and oriented 14 degrees off the vertical direction. A typical vertical cell 52 is shown superimposed over a portion of bar code symbol 58.

Figure 4:
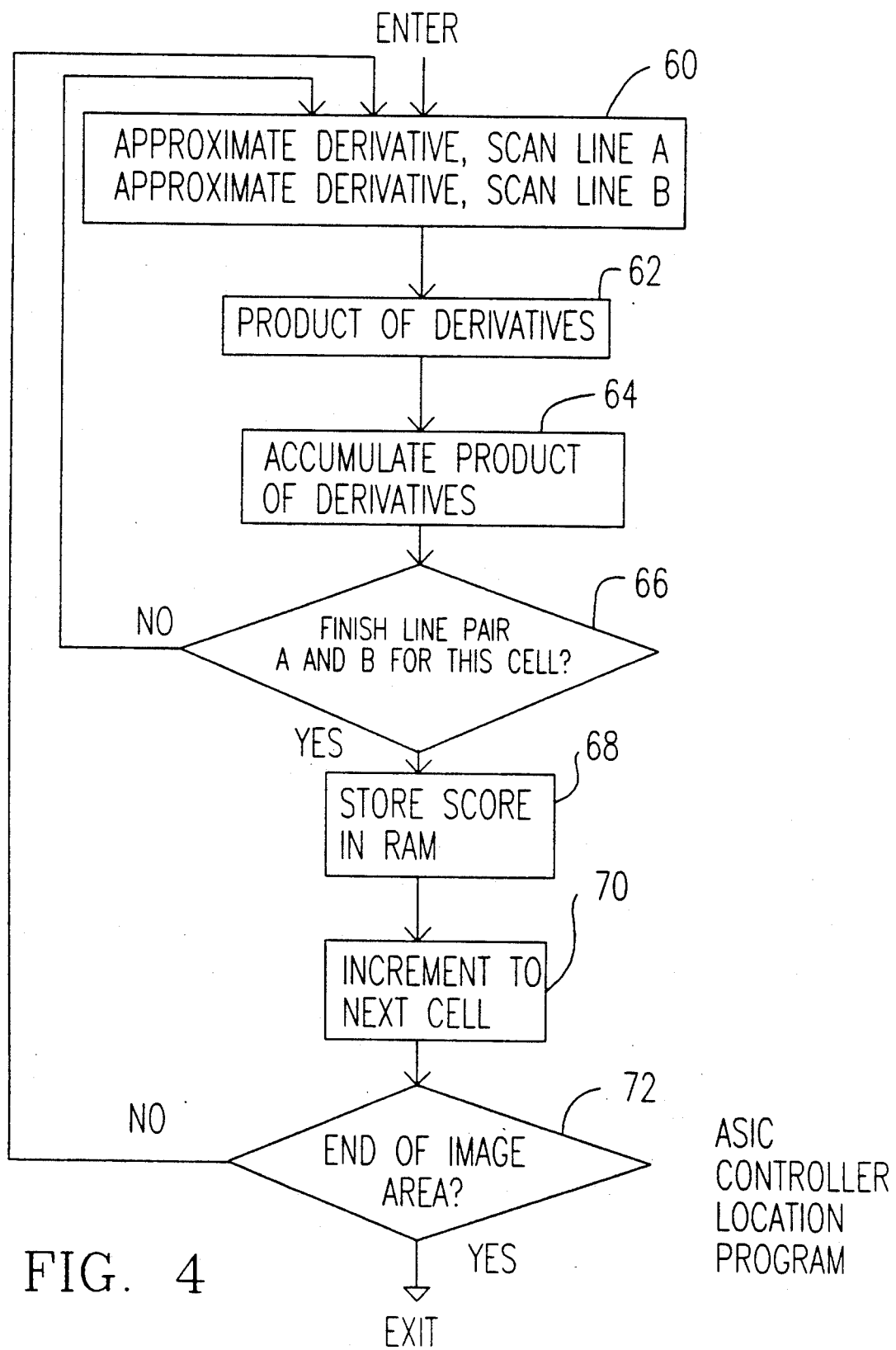
FIG. 4 is a flow chart illustrating the control program for the ASIC controller of FIG. 2, in accordance with the present invention.

The portion of the program of the ASIC controller 34 (FIG. 2) for determining the location or locations likely to contain a bar code symbol is shown in the flow chart of FIG. 4. For a given cell in image area 48, the process uses two scan lines, i.e. scan line A, and scan line B. Specifically, scan line A is the first of the eight scan lines of a given cell, and scan line B is the fifth scan line of a given cell. After entering the location program, the approximate derivative of scan line A, and the approximate derivative of scan line B, are calculated at step 60. For this purpose, a derivative is approximated by taking the difference between any two consecutive pixels. In order to speed up the process of taking an approximate derivative, every other pixel is used in the calculation, i.e. instead of using all 32 pixels across a scan line of a given cell, every other pixel i.e. 16 pixels are used to approximate a derivative.

After finding the approximate derivatives at each point of scan line A and scan line B at step 60, the point by point product of both derivatives is calculated at step 62. Thereafter, the sum of the products of derivatives is accumulated at step 64. This process of accumulating the sum of the product of derivatives continues until all the points of scan lines A and B are completed for this cell at step 66. At this point, the accumulated product of derivatives constitutes the location score for this particular cell. The location score is then stored in SRAM at step 68. The program increments to the next cell in the image area at step 70. The process of computing location scores continues from cell to cell until the end of the image area is detected at step 72, and the program is exited.

Figure 6A:
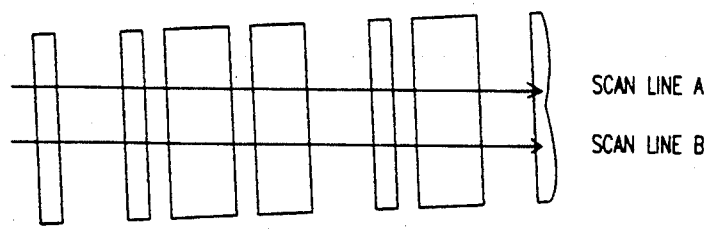
FIG. 6A is a representation of a bar code symbol with two typical parallel scan lines, which may be utilized in conjunction with the embodiments of the present invention.
Figure 6B:
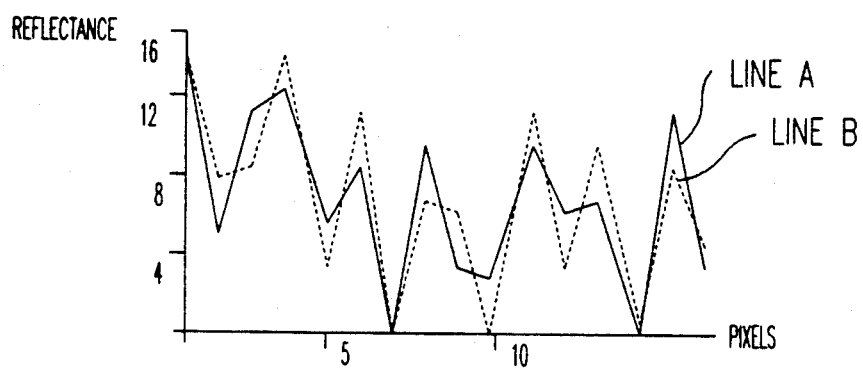
FIG. 6B illustrates the reflectance signals from the two parallel scan lines of FIG. 6A.
Figure 6C:
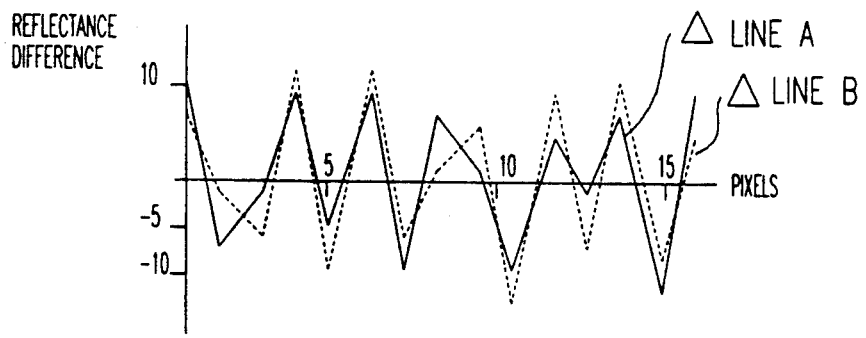
FIG. 6C represents the signal differences between successive data points along each of the two respective scan lines of FIG. 6B utilized in the present invention.
Figure 6D:
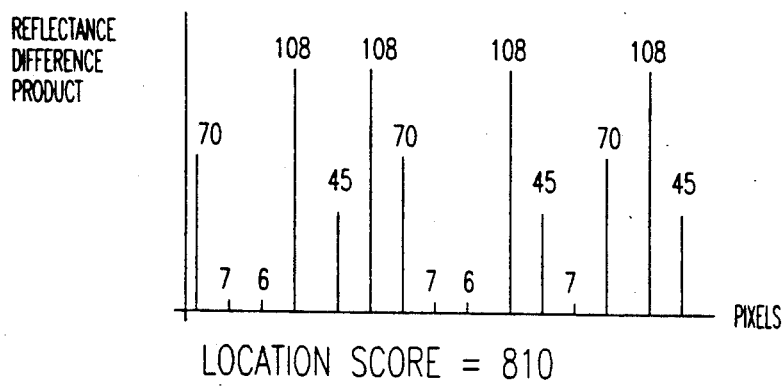
FIG. 6D illustrates the products of the signal differences for each of the respective data points for the signal differences shown in FIG. 6C, and the sum total of all products of the signal differences along two parallel scan lines utilized in conjunction with the present invention.

The process of computing a location score for a cell is illustrated in FIGS. 6A through 6D. In FIG. 6A, scan line A and scan line B are shown at a slight angle across a portion of a bar code symbol. FIG. 6B shows the reflectance signals at approximately 1.5 pixels per narrow bar for both scan line A and scan line B. The data points are simply connected by straight lines. FIG. 6C shows the result of taking the difference between successive data points along scan line A and successive data points along scan line B to produce an approximate derivative shown as delta scan line A and delta scan line B, respectively. FIG. 6D shows the product of each data point along delta scan line A and the corresponding data point along delta scan line B. Thus, each score in FIG. 6D for each data point is the product of the approximate derivatives of each respective data point of scan line A and scan line B. Adding up the sum of the derivatives produces a location score equal to 810, which is a relatively high score because scan line A and scan line B are directly through a bar code symbol.

Figure 7A:
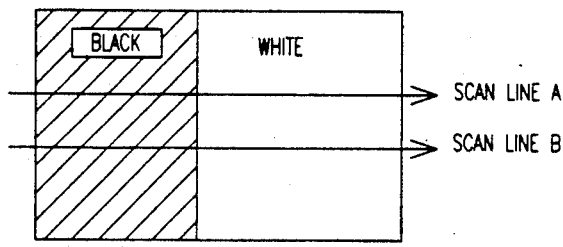
FIG. 7A is a representation of a black to white transition with two typical parallel scan lines, which may be distinguished from a bar code symbol in conjunction with the present invention.
Figure 7B:
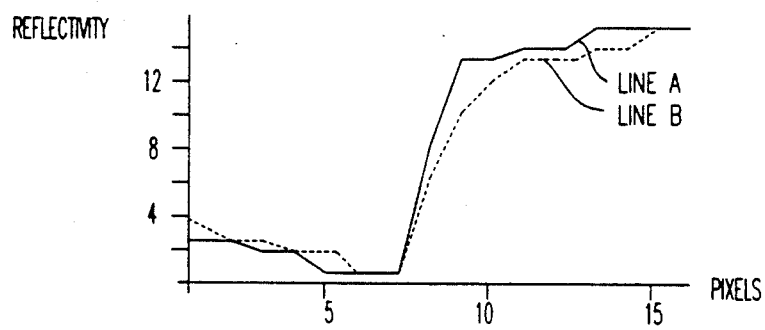
FIG. 7B illustrates the reflectance signals from the two parallel scan lines of FIG. 7A.
Figure 7C:
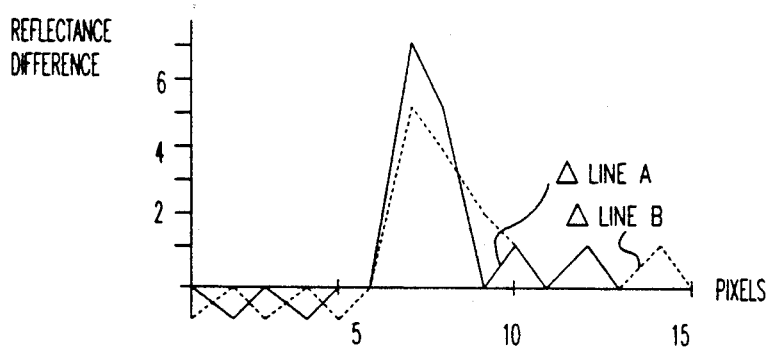
FIG. 7C represents the signal differences between successive data points along each of the two respective scan lines of FIG. 7B utilized in the present invention.
Figure 7D:
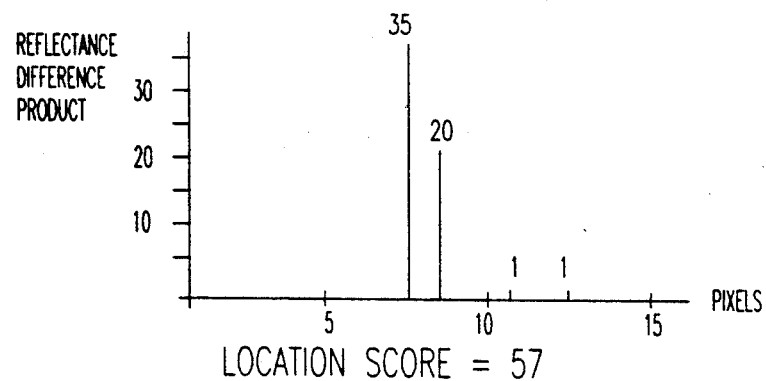
FIG. 7D illustrates the products of the signal differences for each of the respective data points for the signal differences shown in FIG. 7C, and the sum total of all products of the signal differences along two parallel scan lines utilized in the present invention.

To illustrate the ability of the location algorithm to distinguish bar codes from simple transitions between black and white areas, FIGS. 7A through 7D indicate the corresponding location score for a simple black to white transition. FIG. 7A shows an image with a black to white transition with two scan lines, scan line A and scan line B therethrough. FIG. 7B shows the reflectance signals for scan line A and scan line B. FIG. 7C shows the approximate derivative or delta scan line A and delta scan line B, while FIG. 7D shows the sum of the derivatives for each point on both scan line A and scan line B. The resulting location score of 57 from FIG. 7D for the image in FIG. 7A is considerably less than the location score of 810 for the bar code in FIG. 6A.

Figure 5A:
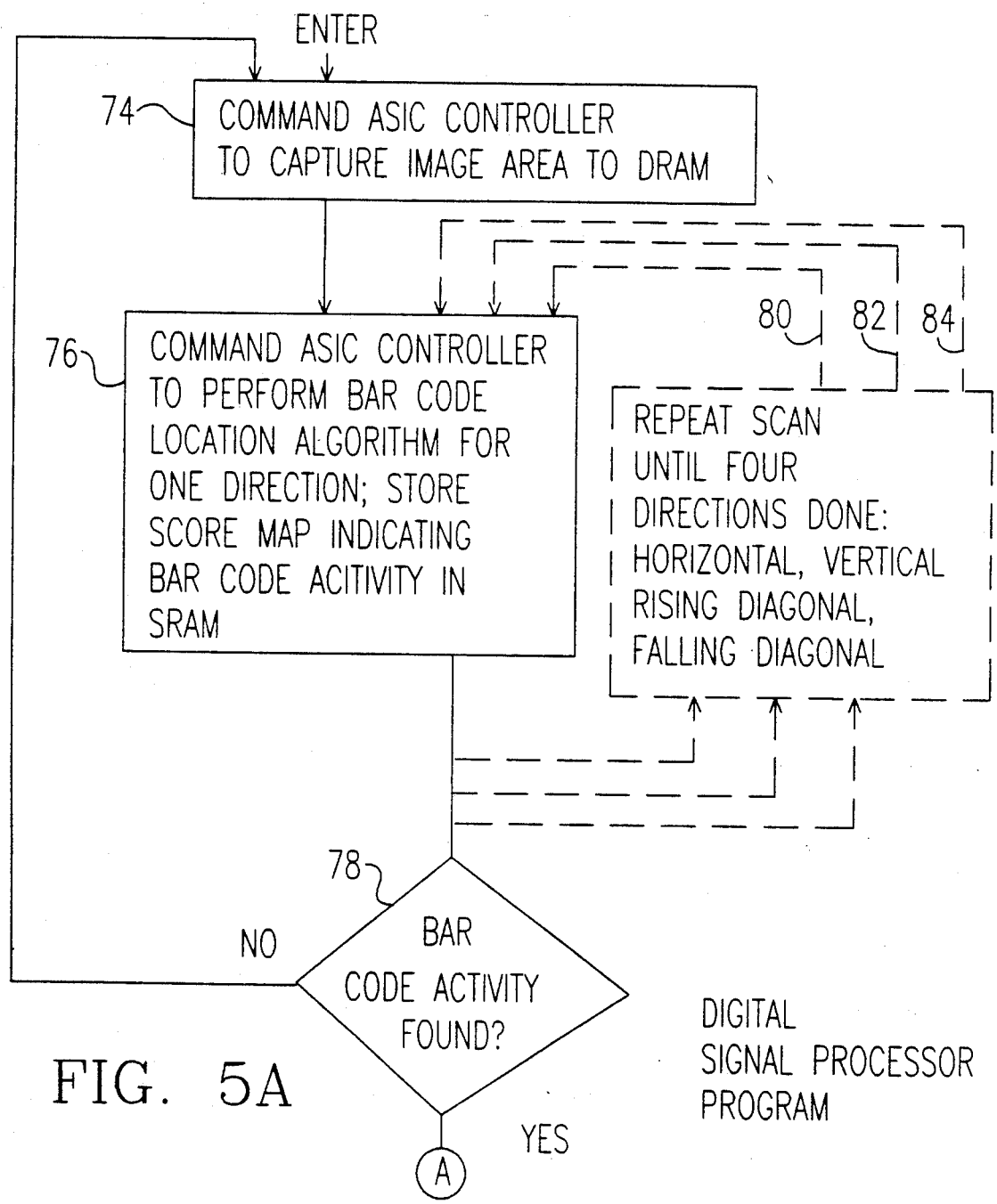
FIGS. 5A and 5B show a flow chart illustrating the control program for the digital signal processor of FIG. 2, in accordance with the present invention.
Figure 5B:
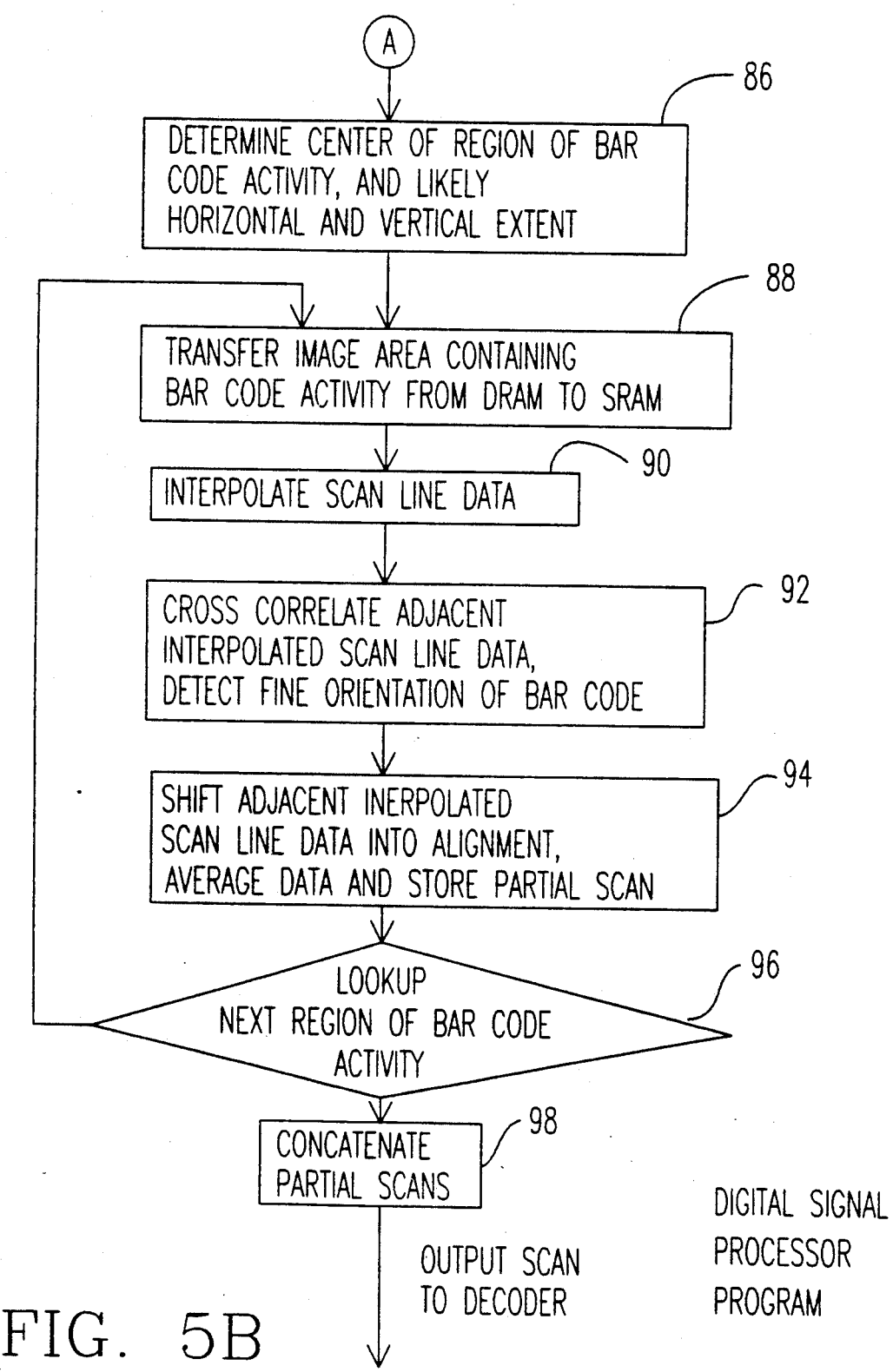

The program flow chart for the digital signal processor 38 in FIG. 2, is shown in FIGS. 5A and 5B. Responsive to an input signal on terminal 40 of FIG. 2, to initiate a bar code read, the digital signal processor 38 enters the program as shown in the flow chart of FIG. 5A. The first step 74, is to command the ASIC controller to capture the image area to DRAM. Once the image area is captured, the next step 76 is to command the ASIC controller to perform the bar code location algorithm (in accordance with the flow chart of FIG. 4, discussed above) for one direction i.e. the horizontal direction. As the location algorithm is performed for all cells in the horizontal direction in image area 48, the ASIC controller stores the results in SRAM. Each cell score, is an indication of the likelihood of bar code activity. The complete set of scores for a given direction forms a map of the likely regions of bar code activity. This process is repeated for all four directions i.e. location scores for a vertical scan are computed and stored in SRAM thorough program loop 80; location scores for a rising diagonal scan, i.e. a 45 degree scan, are computed and stored in SRAM thorough program loop 82; and location scores for a falling diagonal scan, i.e. a 135 degree scan, are computed and stored in SRAM thorough program loop 84.

Once the cell activity score map for a particular direction has been computed and stored in SRAM the digital signal processor program determines whether or not bar code activity is present at step 78. For this purpose, a simple threshold may be utilized, examining all location scores that exceed a given threshold. If no score exceeds a given threshold, then no bar code activity is found, and the program repeats starting from step 74 in which the ASIC controller captures a new image area to DRAM. However, if bar code activity is detected at step 78, the subsequent digital signal processor program, in accordance with the flow chart of FIG. 5B, proceeds to orient, filter, and scan the located bar code.

The first step is to determine from the location scores stored in SRAM, the center of the region of bar code activity, and the likely horizontal and vertical extent of such activity, at step 86. The approximate center and extent of bar code activity may be determined by region growing applied to the cell activity score map. Region growing is a common image processing task to identify a particular region of an overall image which particular region possesses a specific characteristic, in this case, large values. Region growing is a technique well known to those skilled in the art of image processing, and is disclosed in "MATRIX STRUCTURED IMAGE PROCESSING" by Dougherty and Giardina, published 1987 by Prentice-Hall Inc, Englewood Cliffs, N.J. 07632.

After the region of interest has been determined, the digital signal processor commands the ASIC controller to transfer the image area containing bar code activity from DRAM to SRAM at step 88. SRAM memory space is generally smaller than DRAM memory space, and typically represents a few percent of the total image area stored in DRAM. Although SRAM is generally faster than DRAM, the use of a relatively smaller SRAM is more economical since the cost of SRAM is typically more than DRAM. Also, the area of the image stored in SRAM may or may not be related to the size of the cell areas from the DRAM image memory. Due to the smaller size of the SRAM, the latter may hold only a portion of a bar code, in which case processing steps are repeated for partial scans and the partial scans later combined to form a complete scan.

Once the image is transferred to SRAM memory, the digital signal processor interpolates each of the scan lines of data for a given image area of interest at step 90. The process of interpolation is well known to those skilled in the art of digital signal processing, and is described by Peled and Liu in "DIGITAL SIGNAL PROCESSING theory, design, and implementation", published 1976 by John Wiley and Sons. Interpolation increases the effective sampling rate of the scan line data by fitting the best curve to the data with frequencies below the Nyquist limit.

The bar code image is initially sampled at about 1.5 pixels per narrow bar. To create a smoother curve, the signal is upsampled by four times. In simple terms, rather than connecting the data points by straight lines, additional data points are added between the actual data points to form a smoother curve.

After interpolating each of the scan lines at step 90, the first scan line of a given cell is cross-correlated with successive adjacent interpolated scan line data as indicated in step 92. Cross-correlation provides a measure of the similarity, or match, between two curves. Techniques for cross-correlating two signals are well known to those skilled in the art, and a discussion of cross-correlation may be found in "DIGITAL PROCESSING OF SPEECH SIGNALS" by Rabiner and Schafer published 1978 by Prentiss Hall, Englewood Cliffs, N.J. 07632.

Successive cross-correlation between adjacent interpolated scan line data provides a means to determine the fine orientation of the bar code symbol also at step 92. The detected fine orientation of the bar code is derived from the difference between the average peaks of successive cross-correlations between adjacent interpolated scan lines. The position of the peak of the cross-correlation function of two scan lines represents the amount one scan line of data must be shifted in order to provide the best alignment with the other scan line of data. Calculation of the actual angle of the bars is discussed below in relation to FIG. 9A through FIG. 9C.

After the fine orientation of the bar code is known, each interpolated scan line data is shifted into alignment at step 94. After the interpolated scan line data has been shifted into alignment, the average of all scan lines is computed. At this point, the bar code symbol may be decoded into a partial bar code scan at step 94.

The partial bar code scan is stored at step 94, and the next stored region of interest is determined at step 96. That is, the next area of interest which is likely to contain a bar code image is then transferred from DRAM to SRAM at step 88. The process of interpolation and cross-correlation is repeated until another partial bar code scan, representing an adjacent image area of interest, is stored.

Once all of the stored regions containing bar code activity have been scanned, the partial scans are concatenated, or connected to form a complete scan at step 9B. Finally, at step 98 the output scan is forwarded to a decoder, known to those skilled in the art, for converting the complete concatenated bar code scan into a sequence of alphanumeric characters which represent the content of the bar code.

Figure 8A:
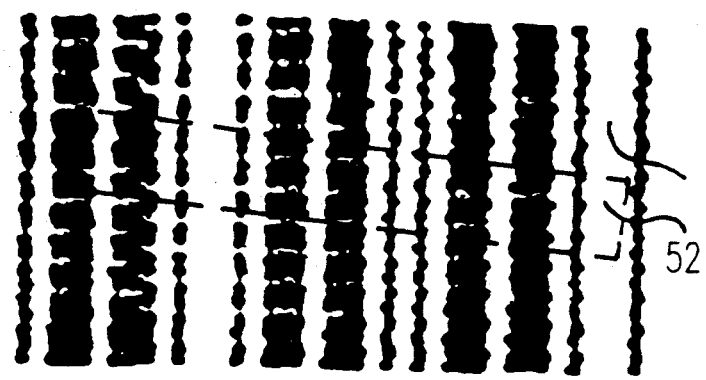
FIG. 8A is an image of a bar code symbol at an angle to the direction of scan with a portion of the scanned area indicated.

FIGS. 8A through 8G and FIGS. 9A through 9C illustrate the processes for detecting fine orientation, filtering and scanning of a bar code that has been located in a given cell. Specifically, FIG. 8A illustrates a vertical cell 52 consisting of 8 scan lines superimposed over a portion of a bar code label 58. The poor appearance, or spottiness of the bars is actually representative of the condition of many printed bar code labels encountered in practice.

Figure 8B:
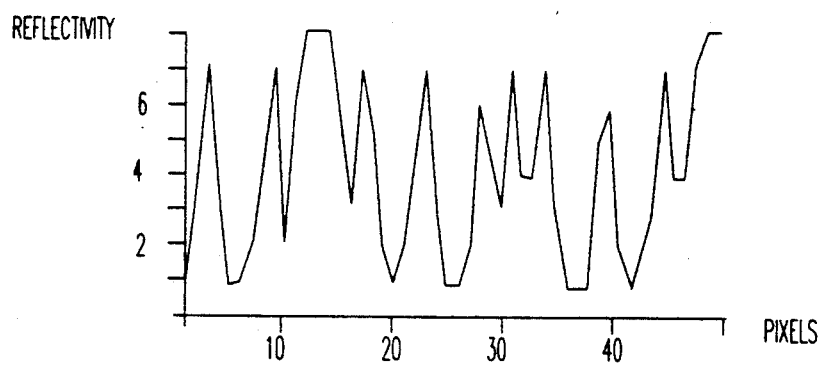
FIG. 8B illustrates the reflectance signal from one scan line of the scanned area indicated in FIG. 8A.
Figure 8C:
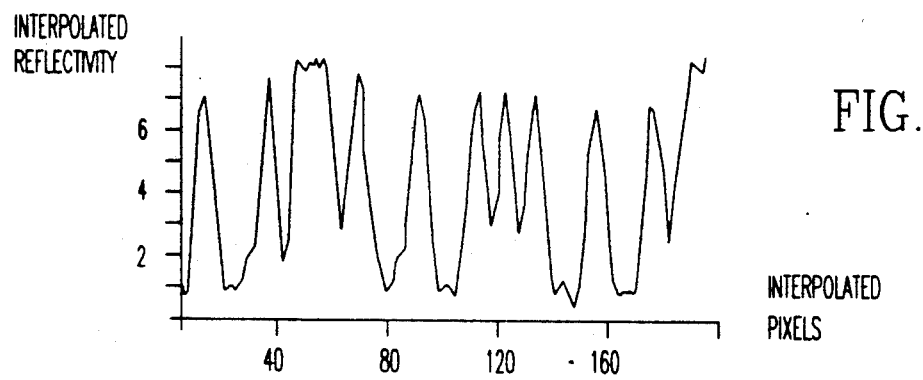
FIG. 8C illustrates the scan line of FIG. 8B after processing by interpolation.
Figure 8D:
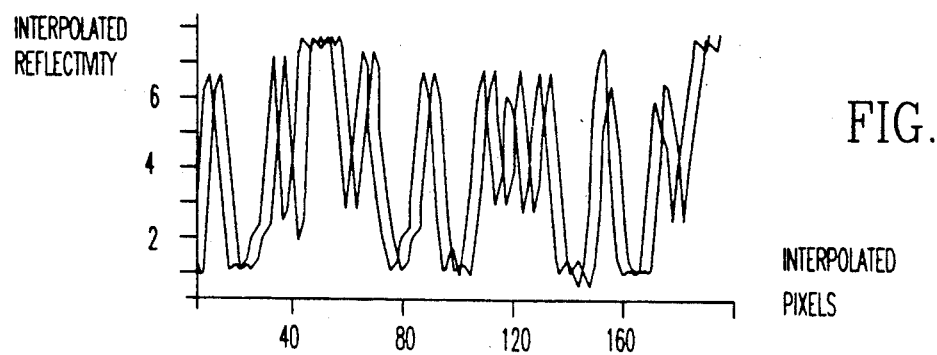
FIG. 8D shows one interpolated scan line and another interpolated scan line, four scan lines apart.

FIG. 8B shows the 32 pixels of the first scan line of cell 52 connected by straight lines. FIG. 8C shows the same 32 data points after interpolation, or upsampling by four times. FIG. 8D shows one upsampled scan line, and another upsampled scan line which is 4 scan lines away. It is evident there is an offset between the two waveforms. This offset is indicative of the orientation offset of the bars.

Although the offset is visibly apparent in FIG. 8D, it is necessary to compute the magnitude of the offset, i.e. the actual orientation angle of the bars. The cross correlation function is well suited for this task.

Figure 9A:
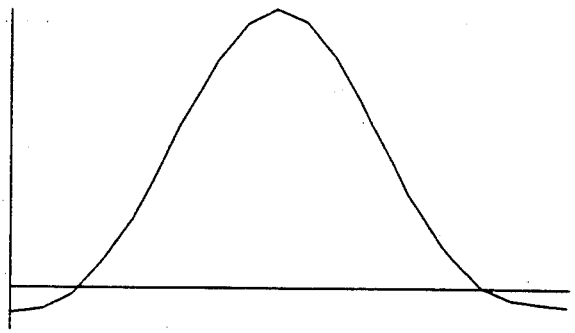
FIG. 9A is the cross-correlation function of the interpolated first and second scan lines of the portion of the scanned area in FIG. 8A.
Figure 9B:
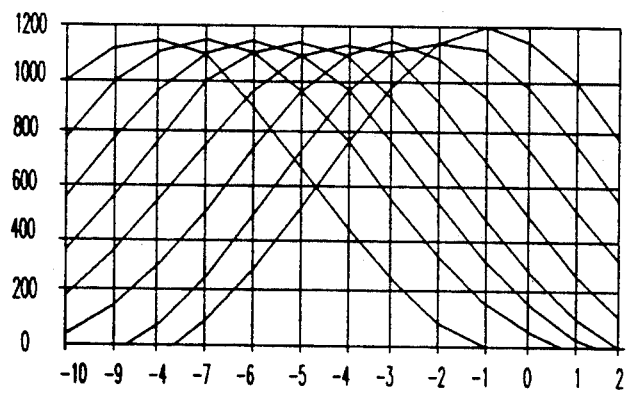
FIG. 9B is a family of cross-correlation curves, each resulting from cross-correlating the first interpolated scan line with successive interpolated scan lines of the portion of the scanned area in FIG. 8A.
Figure 9C:
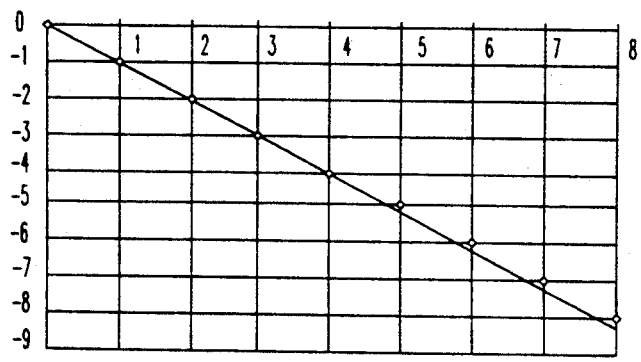
FIG. 9C shows the peak values of the cross-correlation function for each interpolated scan line compared to the first interpolated scan line for the portion of the scanned area indicated in FIG. 8A.

FIGS. 9A through 9C illustrate the process of determining the fine orientation of the bar code symbol. FIG. 9A shows the cross-correlation function of the first and second scan lines of the sampled signal Note that the peak is at a lag of about minus one. This means that over a distance from one scan line to the next, the waveform is shifted one upsampled pixel, or one fourth of an original pixel. This yields a bar code slope of one fourth, or 0.25, which corresponds well with the measured slope of about 14 degrees, since the arctangent of 0.25 equals 14.036 degrees.

FIG. 9B shows a family of cross-correlation curves. Each curve is the result of cross-correlating the first scan line with the scan line successively further away. Note that the peaks step over extremely consistently by one for each curve. By using interpolation, it is possible to find the position of a peak in the cross-correlation function to fractional pixel accuracy. FIG. 9C is a plot of the cross-correlation function for each scan line compared to the first scan line of the given area of interest. Note that the calculated peak values lie almost perfectly along a straight line, the slope of which represents the fine orientation angle of the bar code symbol. In general, not all of the peak values may lie on a straight line, in which case the average slope may be taken to represent the fine orientation of the bar code symbol.

Figure 8E:
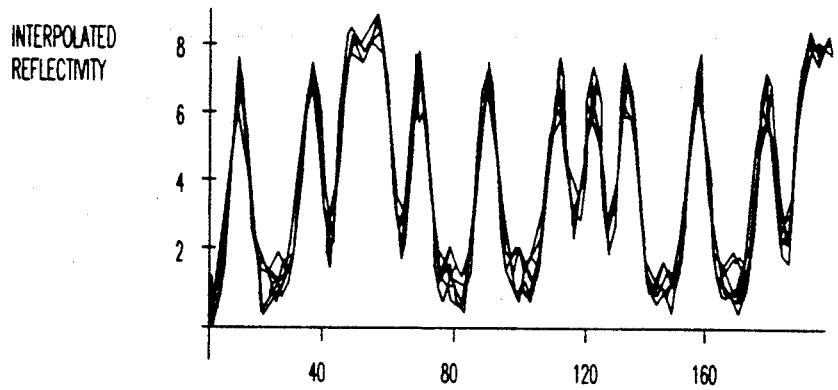
FIG. 8E shows eight interpolated scan lines which have been shifted respectively into alignment.
Figure 8F:
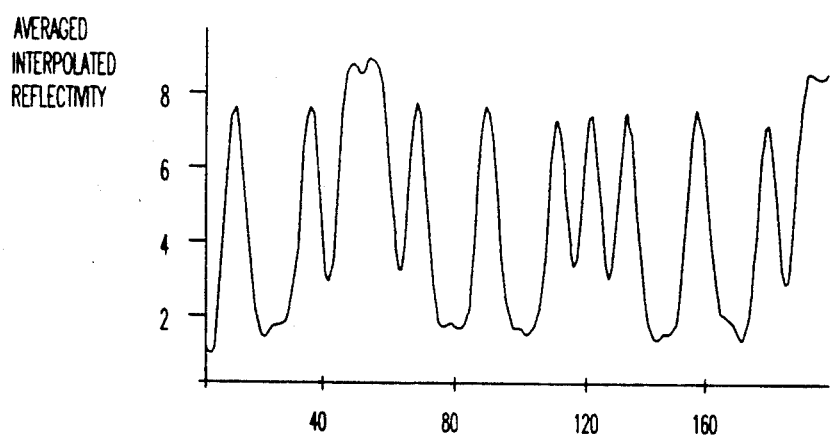
FIG. 8F shows the average of the eight interpolated and shifted scan lines of FIG. 8E.

Once the fine orientation of the bars is known, each of the interpolated scan line data is shifted into alignment as shown in FIG. 8E, and the average value taken as shown in FIG. 8F. Taking the average of corresponding sample points from the shifted lines of interpolated scan line data, provides a simple approach to bar code filtering. Averaging effectively filters perpendicular to the orientation of the bar code. In the alternative, the median value of each data point could be used to reduce the effect of occasional missing pieces of the bar code label. That is, a white spot on a black bar effects the median data value less than the average data value. Another approach is to take a weighted average based on cross-correlation scores to provide better rejection of poorly correlated scan line data. In the latter case, those interpolated scan lines that correlate well with each other would count more heavily in the average, while those interpolated scan lines which cross-correlate poorly would weight the average correspondingly less.

As used herein, "shifting" scan line data includes both actual shifting of scan line data within the image memory as well as virtual shifting of scan line data by the use of an offset vector to be added to the location of sequential values extracted from said memory.

It is further noted that bar code fine orientation may be achieved by cross-correlation of selected pairs of scan line data alone, without interpolation of scan line data if there are sufficient data points, or pixels per narrow bar. Otherwise, interpolation is used to generate the additional data points for the cross-correlation to be meaningful. Finally, in shifting scan lines into alignment, all successive scan line data may be correlated to a single reference line, or in the alternative, successive scan line data may be correlated in line pairs and not referenced to a single scan line.

Figure 8G:
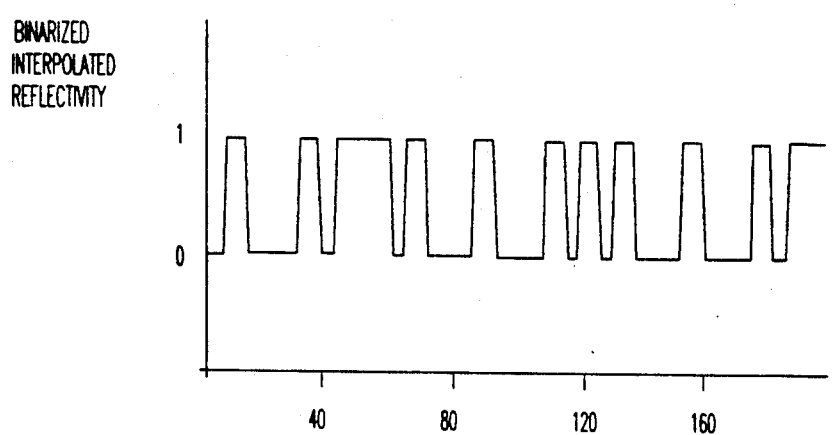
FIG. 8G is a binary signal representation of the waveform of FIG. 8F using the overall signal average as the binary threshold value.

The aggregate waveform in FIG. 8F is then converted to a binary value waveform as shown in FIG. 8G using the overall signal average as the binary threshold. The zero level of the waveform in FIG. 8G corresponds to the black level of the bar code in FIG. 8A, while the one level corresponds to the white level.

Figure 10:
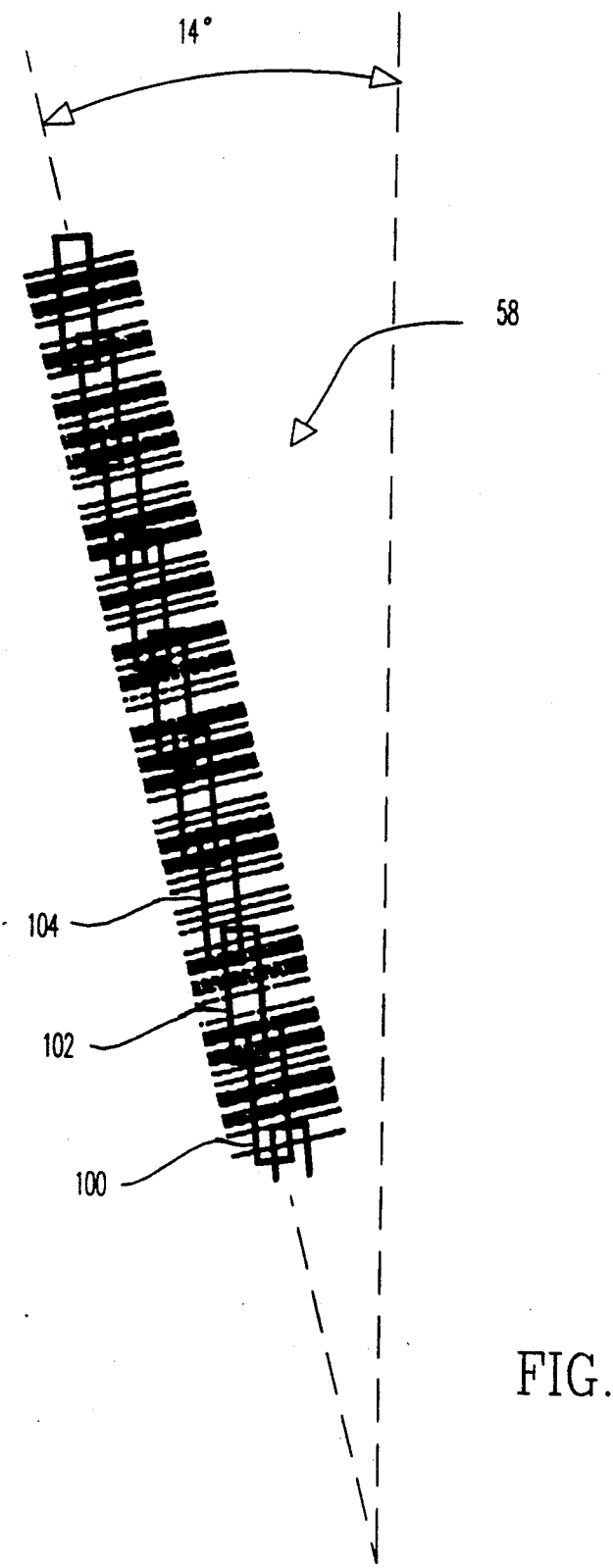
FIG. 10 is an illustration of a bar code symbol, depicting the manner in which overlapping partial scans are concatenated to form a complete scan.

Thus, a partial scan of the bar code shown in FIG. 8A corresponding to the cell 52 has been performed. FIG. 10 shows how successive partial scans 100, 102 and 104 may be concatenated to form a complete scan of bar code 58. The partial scans overlap each other so that no bar code data is lost. The successive partial scans are taken in steps along an angle corresponding to the measured fine orientation of the bars. That is, since the fine orientation of the bars is 14 degrees, a staircase of partial scans along a 14 degree angle off the vertical, is constructed in order to acquire partial scans which can be concatenated into a complete scan of the bar code label.

Thus, a bar code reader has been disclosed which is capable of reading a bar code symbol contained anywhere within the field of view of an image area in an omnidirectional manner. Although the embodiment disclosed suggests the use of an area image capture device, it will be appreciated that a linear image capture device as may be used with a moving conveyor belt, may also be used.

What is claimed is:

1. In a bar code reader, a method for detecting the location of a bar code symbol comprising:
   capturing a two dimensional image for storage in a memory, said stored two dimensional image containing an image of a bar code symbol anywhere within the field of view of said stored two dimensional image;
   approximately a derivative of a first scan line in a given area of said stored two dimensional image;
   approximately a derivative of a second scan line substantially parallel to said first scan line in said given area of said stored two dimensional image;
   multiplying said derivative of said first scan line and said derivative of said second scan line respectively to obtain a product of said derivative of said first scan line and said derivative of said second scan line respectively;
   accumulating a sum of the respective products of said derivative of said first scan line and said derivative of said second scan line to provide a location score signal for said stored two dimensional image, wherein said location score signal represents the relative likelihood that said given area of said stored two dimensional image contains a bar code image; and
   scanning said captured image stored in said memory, responsive to said location score signal indicating that said stored two dimensional image contains a bar code image, in said given area to scan said bar code symbol.

2. A method in accordance with claim 1, for detecting the location of a bar code symbol, wherein said steps of approximating the derivatives of said first and second scan lines respectively comprises:
   subtracting a previous pixel value from a present pixel value along said first scan line to determine the approximate derivative of said first scan line; and
   subtracting a previous pixel value from a present pixel value along said second scan line to determine the approximate derivative of said second scan line.

3. A method in accordance with claim 1, for detecting the location of a bar code symbol further comprising:
   determining whether said location score corresponding to said given area exceeds a predetermined threshold,
   wherein said location score exceeding said predetermined threshold is an indication that said given area of said stored two dimensional image contains a bar code image.

4. A method in accordance with claim 1, for detecting the location of a bar code symbol further comprising:
   storing respective location scores for a plurality of areas of said stored two dimensional image; and
   determining by region growing, which of said plurality of areas of said stored two dimensional image have respective location scores which correspond to a region which includes said located bar code image.

5. A method in accordance with claim 1, for detecting the location of a bar code symbol further including a method for determining the coarse orientation of said bar code symbol, comprising:
   selecting a plurality of substantially parallel first and second scan lines in said given area, wherein each of said plurality of pairs of substantially parallel first and second scan lines, respectively define a plurality of scan directions through said stored image.

6. In a bar code reader, a method for determining the orientation of a bar code symbol comprising:
   capturing a two dimensional image for storage in a memory, said stored two dimensional image containing an image of a bar code symbol anywhere within the field of view of said stored two dimensional image;
   interpolating a first scan line in a given area of said stored two dimensional image;
   interpolating a second scan line substantially parallel to said first scan line in said given area of said stored two dimensional image;
   calculating a cross-correlation function of said interpolated first scan line data and said interpolated second scan line data;
   detecting a peak of said cross-correlation function of said first and second interpolated scan line data, wherein the position of said peak of said cross-correlation function of said interpolated first and second scan line data corresponds to the orientation of said bar code image; and
   scanning said captured image stored in said memory responsive to said detected peak of said cross-correlation function, along a line having substantially said orientation to scan said bar code symbol.

7. A method in accordance with claim 6, further comprising:
   shifting said interpolated second scan line data so as to be aligned with said interpolated first scan line data in accordance with said detected peak of said cross-correlation function of said interpolated first and second scan line data.

8. A method in accordance with claim 6, for determining the orientation of a bar code symbol further comprising:

interpolating a third scan line in said given area substantially parallel to said first scan line in said stored two dimensional image;

calculating a cross-correlation function of said interpolated first scan line data and said interpolated third scan line data, respectively; and detecting a peak of said cross-correlation function of said first and third interpolated scan line data, wherein the position of said peak of said cross-correlation function of said interpolated first and third scan line data corresponds to the orientation of said bar code image.

9. A method in accordance with claim 8, further comprising:

shifting said interpolated second and third scan line data so as to be aligned respectively with said interpolated first scan line data in accordance with said detected peaks of said cross-correlation function of said interpolated first and second scan line data and said cross-correlation function of said interpolated first and third scan line data, respectively.

10. A method in accordance with claim 6, for determining the orientation of a bar code symbol further comprising:

interpolating a plurality of scan lines in said given area of said stored two dimensional image; and calculating the respective cross-correlation function of selected pairs of interpolated scan lines from said plurality of interpolated scan lines.

11. A method in accordance with claim 10, further comprising:

shifting said interpolated plurality of scan line data respectively so as to be aligned.

12. A method in accordance with claim 11, further comprising:

filtering said bar code image by taking the average of corresponding data points from said plurality of shifted and interpolated scan line data.

13. A method in accordance with claim 11, further comprising:

filtering said bar code image by taking the median of corresponding data points of said plurality of shifted and interpolated scan line data.

14. A method in accordance with claim 11, further comprising:

filtering said bar code image by taking the weighted average of corresponding data points of said plurality of shifted and interpolated scan line data, said average being weighted according to the magnitude of said cross-correlation function between said plurality of said respective interpolated scan line data and said plurality of interpolated first scan line data.

15. A method in accordance with claim 10, further comprising:

filtering said bar code image by combining corresponding data points of said shifted and interpolated plurality of scan line data.

16. A method in accordance with claim 15, further comprising:

converting said filtered bar code image to a binary function using the average value of said combined shifted and interpolated plurality of scan line data as the binary threshold value.

17. In a bar code reader, a method for detecting a bar code symbol comprising:

capturing a two dimensional image for storage in a memory, said stored two dimensional image containing an image of a bar code symbol anywhere within the field of view of said stored two dimensional image;

locating an area within the field of view of said stored two dimensional image likely to contain a bar code image, said locating step comprising:

approximately a derivative of a first scan line in a given area of said stored two dimensional image;

approximating a derivative of a second scan line substantially parallel to said first scan line in said given area of said stored two dimensional image;

multiplying said derivative of said first scan line and said approximate derivative of said second scan line respectively to obtain a product of said derivative of said first scan line and said derivative of said second scan line respectively; and accumulating a sum of the respective products of said derivatives of said first scan line and said derivative of said second scan line to provide a location score for said stored two dimensional image, wherein said location score signal represents the likelihood that said given area of said stored two dimensional image contains a bar code image;

examining the image within said located area of said stored two dimensional image to determine the orientation of said bar code image, said step of examining the image within said located area of said stored two dimensional image comprising:

interpolating a first scan line in said located area of said stored two dimensional image;

interpolating a second scan line substantially parallel to said first scan line in said located area of said stored two dimensional image;

calculating a cross-correlation function of said interpolated first scan line data and said interpolated second scan line data; and detecting a peak of said cross-correlation function of said first and second interpolated scan line data, wherein the position of said peak of said cross-correlation function of said interpolated first and second scan line data corresponds to the orientation of said bar code image; and scanning said captured image stored in said memory, responsive to said location score signal indicating that said stored two dimensional image contains a bar code image, in said given area along a line having substantially said orientation to scan said bar code symbol.

18. In a bar code reader, an apparatus for detecting the location of a bar code symbol comprising:

means for capturing a two dimensional image for storage in a memory, said stored two dimensional image containing an image of a bar code symbol anywhere within the field of view of said stored two dimensional image;

means for approximating a derivative of a first scan line in a given area of said stored two dimensional image;

means for approximating a derivative of a second scan line substantially parallel to said first scan line in said given area of said stored two dimensional image;

means for multiplying said derivative of said first scan line and said derivative of said second scan line respectively to obtain a product of said derivative of said first scan line and said derivative of said second scan line respectively;

means for accumulating a sum of the respective products of said derivative of said first scan line and said derivative of said second scan line to provide a location score signal for said stored two dimensional image, wherein said location score represents the relative likelihood that said given area of said stored two dimensional image contains a bar code image; and means for scanning said captured image stored in said memory, responsive to said location score signal indicating that said stored two dimensional image contains a bar code image, in said given area to scan said bar code symbol.

19. An apparatus in accordance with claim 18, for detecting the location of a bar code symbol, wherein said means for approximating the derivatives of said first and second scan lines respectively comprises:

means for subtracting a previous pixel value from a present pixel value along said first scan line to determine the approximate derivative of said first scan line; and means for subtracting a previous pixel value from a present pixel value along said second scan line to determine the approximate derivative of said second scan line.

20. An apparatus in accordance with claim 18, for detecting the location of a bar code symbol further comprising:

means for determining whether said location score corresponding to said given area exceeds a predetermined threshold, wherein said location score exceeding said predetermined threshold is an indication that said given area of said stored two dimensional image contains a bar code image.

21. An apparatus in accordance with claim 18, for detecting the location of a bar code symbol further comprising:

means for storing respective location scores for a plurality of areas of said stored two dimensional image; and means for determining by region growing, which of said plurality of areas of said stored two dimensional image have respective location scores which correspond to a region which includes said located bar code image.

22. A method in accordance with claim 18, for detecting the location of a bar code symbol further including a method for determining the coarse orientation of said bar code symbol, comprising:

selecting a plurality of substantially parallel first and second scan lines in said given area, wherein each of said plurality of pairs of substantially parallel first and second scan lines, respectively define a plurality of scan directions through said stored image.

23. In a bar code reader, an apparatus for determining the orientation of a bar code symbol comprising:

means for capturing a two dimensional image for storage in a memory, said stored two dimensional image containing an image of a bar code symbol anywhere within the field of view of said stored two dimensional image;

means for interpolating a first scan line in a given area of said stored two dimensional image;

means for interpolating a second scan line substantially parallel to said first scan line in said given area of said stored two dimension image;

means for calculating a cross-correlation function of said interpolated first scan line data and said interpolated second scan line data;

means for detecting a peak of said cross-correlation function of said first and second interpolated scan line data, wherein the position of said peak of said cross-correlation function of said interpolated first and second scan line data corresponds to the orientation of said bar code image; and means for scanning said captured image stored in said memory, responsive to said detected peak of said cross-correlation function, along a line having substantially said orientation to scan said bar code symbol.

24. An apparatus in accordance with claim 23, further comprising:

means for shifting said interpolated second scan line data so as to be aligned with said interpolated first scan line data in accordance with said detected peak of said cross-correlation function of said interpolated first and second scan line data.

25. An apparatus in accordance with claim 23, for determining the orientation of a bar code symbol further comprising:

means for interpolating a third scan line in said given area substantially parallel to said first scan line in said stored two dimensional image;

means for calculating the cross-correlation function of said interpolated first scan line data and said interpolated third scan line data, respectively; and means for detecting the peak of said cross-correlation function of said first and third interpolated scan line data, wherein the position of said peak of said cross-correlation function of said interpolated first and third scan line data corresponds to the orientation of said bar code image.

26. An apparatus in accordance with claim 25, further comprising:

means for shifting said interpolated second and third scan line data so as to be aligned respectively with said interpolated first scan line data in accordance with said detected peaks of said cross-correlation function of said interpolated first and second scan line data and said cross-correlation function of said interpolated first and third scan line data, respectively.

27. An apparatus in accordance with claim 23, for determining the orientation of a bar code symbol further comprising:

means for interpolating a plurality of scan lines in said given area of said stored two dimensional image; and means for calculating the respective cross-correlation function of selected pairs of interpolated scan lines from said plurality of said interpolated scan lines.

28. An apparatus in accordance with claim 27, further comprising:

means for shifting said interpolated plurality of scan line data respectively so as to be aligned.

29. An apparatus in accordance with claim 28, further comprising:

means for filtering said bar code image by taking the average of corresponding data points from said plurality of shifted and interpolated scan line data.

30. An apparatus in accordance with claim 28, further comprising:
means for filtering said bar code image by taking the median of corresponding data points of said plurality of shifted and interpolated scan line data.

31. An apparatus in accordance with claim 28, further comprising:
means for filtering said bar code image by taking the weighted average of corresponding data points of said plurality of shifted and interpolated scan line data, said average being weighted according to the magnitude of said cross-correlation function between said plurality of said respective interpolated scan line data.

32. An apparatus in accordance with claim 27, further comprising:
means for filtering said bar code image by combining corresponding data points of said shifted and interpolated plurality of scan line data.

33. An apparatus in accordance with claim 32, further comprising: means for converting said filtered bar code image to a binary function using the average value of said combined shifted and interpolated plurality of scan line data as the binary threshold value.

34. In a bar code reader, an apparatus for detecting a bar code symbol comprising:
means for capturing a two dimensional image for storage in a memory, said stored two dimensional image containing an image of a bar code symbol anywhere within the field of view of said stored two dimensional image;
means for locating an area within the field of view of said stored two dimensional image likely to contain a bar code image, said locating means comprising:
means for approximating a derivative of a first scan line in a given area of said stored two dimensional image;
means for approximating a derivative of a second scan line substantially parallel to said first scan line in said given area of said stored two dimensional image;
means for multiplying said derivative of said first scan line and said derivative of said second scan line respectively to obtain a product of said derivative of said first scan line and said derivative of said second scan line respectively; and
means for accumulating a sum of the respective products of said derivative of said first scan line and said derivative of said second scan line to provide a location score signal for said stored two dimensional image, wherein said location score signal represents the likelihood that said given area of said stored two dimensional image contains a bar code image;
means for examining the image within said located area of said stored two dimensional image to determine the orientation of said bar code image, said means for examining the image within said located area of said stored two dimensional image comprising:
means for interpolating a first scan line in said located area of said stored two dimensional image;
means for interpolating a second scan line substantially parallel to said first scan line in said located area of said stored two dimensional image;
means for calculating a cross-correlation function of said interpolated first scan line and said interpolated second scan line; and
means for detecting a peak of said cross-correlation function of said first and second interpolated scan line, wherein the position of said peak of said cross-correlation function of said interpolated first and second scan line corresponds to the orientation of said bar code image; and
means for scanning said captured image stored in said memory, responsive to said location score signal indicating that said stored two dimensional image contains a bar code image, in said given area along a lone having substantially said orientation to scan said bar code symbol.

35. In a bar code reader, a method for determining the orientation of a bar code symbol comprising:
capturing a two dimensional image for storage in a memory, said stored two dimensional image containing an image of a bar code symbol anywhere within the field of view of said stored two dimensional image;
selecting a first scan line in a given area of said stored two dimensional image;
selecting a second scan line substantially parallel to said first scan line in said given area of said stored two dimensional image;
calculating a cross-correlation function of said selected first scan line and said selected second scan line; and
detecting a peak of said cross-correlation function of said first and second selected scan line, wherein the position of said peak of said cross-correlation function of said selected first and second scan lines corresponds to the orientation of said bar code image; and
scanning said captured image stored in said memory, responsive to said detected peak of said cross-correlation function, along a line having substantially said orientation to scan said bar code symbol.

36. A method in accordance with claim 35, further comprising:
shifting said selected second scan line so as to be aligned with said selected first scan line in accordance with said detected peak of said cross-correlation function of said selected first and second scan lines.

37. A method in accordance with claim 35, for determining the orientation of a bar code symbol further comprising:
selecting a third scan line in said given area substantially parallel to said first scan line in said stored two dimensional image;
calculating the cross-correlation function of said selected first scan line and said selected third scan line, respectively; and
detecting the peak of said cross-correlation function of said first and third selected scan lines, wherein the position of said peak of said cross-correlation function of said selected first and third scan lines corresponds to the orientation of said bar code image.

38. A method in accordance with claim 37, further comprising:
shifting said selected second and third scan lines so as to be aligned respectively with said selected first scan line in accordance with said detected peaks of said cross-correlation function of said selected first and second scan lines and said cross-correlation function of said selected first and third scan lines, respectively.

39. A method in accordance with claim 35, for determining the orientation of a bar code symbol further comprising:
selecting a plurality of scan lines in said given area of said stored two dimensional image; and
calculating the respective cross-correlation function of selected pairs of selected scan lines from said plurality of selected scan lines.

40. A method in accordance with claim 39, further comprising:
shifting said selected plurality of scan lines respectively so as to be aligned.

41. A method in accordance with claim 40, further comprising:
filtering said bar code image by taking the average of corresponding data points from said plurality of shifted and selected scan lines.

42. A method in accordance with claim 40, further comprising:
filtering said bar code image by taking the median of corresponding data points of said plurality of shifted and selected scan lines.

43. A method in accordance with claim 40, further comprising:
filtering said bar code image by taking the weighted average of corresponding data points of said plurality of shifted and selected scan lines, said average being weighted according to the magnitude of said cross-correlation function between said plurality of said respective selected scan lines and said plurality of selected first scan lines.

44. A method in accordance with claim 39, further comprising:
filtering said bar code image by combining corresponding data points of said shifted and selected plurality of scan lines.

45. A method in accordance with claim 44, further comprising:
converting said filtered bar code image to a binary function using the average value of said combined shifted and selected plurality of scan lines as the binary threshold value.

46. In a bar code reader, an apparatus for determining the orientation of a bar code symbol comprising:
means for capturing a two dimensional image for storage in a memory, said stored two dimensional image containing an image of a bar code symbol anywhere within the field of view of said stored two dimensional image;
means for selecting a first scan line in a given area of said stored two dimensional image;
means for selecting a second scan line substantially parallel to said first scan line in said given area of said stored two dimensional image;
means for calculating a cross-correlation function of said selected first scan line and said selected second scan line;
means for detecting a peak of said cross-correlation function of said first and second selected scan lines, wherein the position of said peak of said cross-correlation function of said selected first and second scan lines corresponds to the orientation of said bar code image; and
means for scanning said captured image stored in said memory, responsive to said detected peak of said cross-correlation function, along a line having substantially said orientation to scan said bar code symbol.

47. An apparatus in accordance with claim 46, further comprising:
means for shifting said selected second scan line so as to be aligned with said selected first scan line in accordance with said detected peak of said cross-correlation function of said selected first and second scan lines.

48. An apparatus in accordance with claim 46, for determining the orientation of a bar code symbol further comprising:
means for selecting a third scan line in said given area substantially parallel to said first scan line in said stored two dimensional image;
means for calculating the cross-correlation function of said selected first scan line and said selected third scan line, respectively; and
means for detecting the peak of said cross-correlation function of said first and third selected scan lines, wherein the position of said peak of said cross-correlation function of said selected first and third scan lines corresponds to the orientation of said bar code image.

49. An apparatus in accordance with claim 48, further comprising:
means for shifting said selected second and third scan lines so as to be aligned respectively with said selected first scan line in accordance with said detected peaks of said cross-correlation function of said selected first and second scan lines and said cross-correlation function of said selected first and third scan lines, respectively.

50. An apparatus in accordance with claim 46, for determining the orientation of a bar code symbol further comprising:
means for selecting a plurality of scan lines in said given area of said stored two dimensional image; and
means for calculating the respective cross-correlation function of selected pairs of selected scan lines from said plurality of said selected scan lines.

51. An apparatus in accordance with claim 50, further comprising:
means for shifting said selected plurality of scan lines respectively so as to be aligned.

52. An apparatus in accordance with claim 51, further comprising:
means for filtering said bar code image by taking the average of corresponding data points from said plurality of shifted and selected scan lines.

53. An apparatus in accordance with claim 51, further comprising:
means for filtering said bar code image by taking the median of corresponding data points of said plurality of shifted and selected scan lines.

54. An apparatus in accordance with claim 51, further comprising:
means for filtering said bar code image by taking the weighted average of corresponding data points of said plurality of shifted and selected scan lines, said average being weighted according to the magnitude of said cross-correlation function between said plurality of said respective selected scan lines.

55. An apparatus in accordance with claim 50, further comprising:
   means for filtering said bar code image by combining corresponding data points of said shifted and selected plurality of scan lines.

56. An apparatus in accordance with claim 55, further comprising:
   means for converting said filtered bar code image to a binary function using the average value of said combined shifted and selected plurality of scan lines as the binary threshold value.

57. In a bar code reader, a method for detecting a bar code symbol comprising:
   capturing a two dimensional image for storage in a memory, said stored two dimensional image containing an image of a bar code symbol anywhere within the field of view of said stored two dimensional image;
   locating an area within the field of view of said stored two dimensional image likely to contain a bar code image, said locating step comprising;
      approximating a derivative of a first scan line in a given area of said stored two dimensional image;
      approximating a derivative of a second scan line substantially parallel to said first scan line in said given area of said stored two dimensional image;
      multiplying said derivative of said first scan line and said approximate derivative of said second scan line respectively to obtain a product of said derivative of said first scan line and said derivative of said second scan line respectively; and
      accumulating a sum of the respective products of said derivative of said first scan line and said derivative of said second scan line to provide a location score signal for said stored two dimensional image, wherein said location score signal represents the likelihood that said given area of said stored two dimensional image contains a bar code image;
   examining the image within said located area of said stored two dimensional image to determine the orientation of said bar code image, said step of examining the image within said located area of said stored two dimensional image comprising:
      selecting a first scan line in said located area of said stored two dimensional image;
      selected a second scan line substantially parallel to said first scan line in said located area of said stored two dimensional image;
      calculating a cross-correlation function of said selected first scan line and said selected second scan line; and
      detecting a peak of said cross-correlation function of said first and second selected scan lines, wherein the position of said peak of said cross-correlation function of said selected first and second scan lines corresponds to the orientation of said bar code image; and scanning said captured image stored in said memory, responsive to said location score signal indicating that said stored two dimensional image contains a bar code image, in said given area along a line having substantially said orientation to scan said bar code symbol.

58. In a bar code reader, an apparatus for detecting a bar code symbol comprising:
   means for capturing a two dimensional image for storage in a memory, said stored two dimensional image containing an image of a bar code symbol anywhere within the field of view of said stored two dimensional image;
   means for locating an area within the field of view of said stored two dimensional image likely to contain a bar code image, said locating means comprising:
      means for approximating a derivative of a first scan line in a given area of said stored two dimensional image;
      means for approximating a derivative of a second scan line substantially parallel to said first scan line in said given area of said stored two dimensional image;
      means for multiplying said derivative of said first scan line and said derivative of said second scan line respectively to obtain a product of said derivative of said first scan line and said derivative of said second scan line respectively; and
      means for accumulating a sum of the respective products of said derivative of said first scan line and said derivative of said second scan line to provide a location score signal for said stored two dimensional image, wherein said location score signal represents the likelihood that said given area of said stored two dimensional image contains a bar code image;
   means for examining the image within said located area of said stored two dimensional image to determine the orientation of said bar code image, said means for examining the image within said located area of said stored two dimensional image comprising:
      means for selecting a first scan line in said located area of said stored two dimensional image;
      means for selecting a second scan line substantially parallel to said first scan line in said located area of said stored tow dimensional image;
      means for calculating a cross-correlation function of said selected first scan line and said selected second scan line; and
      means for detecting a peak of said cross-correlation function of said first and second selected scan lines, wherein the position of said peak of said cross-correlation function of said selected first and second scan lines corresponds to the orientation of said bar code image; and
   means for scanning said captured image stored in said memory, responsive to said located score signal indicating that said stored two dimensional image contains a bar code image, in said given area along a line having substantially said orientation to scan said bar code symbol.

* * * * *